US012798003B2

(12) United States Patent
Yamamoto et al.

(10) Patent No.: US 12,798,003 B2
(45) Date of Patent: Nov. 17, 2026

(54) LASER WELDING METHOD

(71) Applicant: TOYOTA JIDOSHA KABUSHIKI KAISHA, Toyota (JP)

(72) Inventors: Takeshi Yamamoto, Nisshin (JP); Ryuta Matsuo, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 471 days.

(21) Appl. No.: 18/598,863

(22) Filed: Mar. 7, 2024

(65) Prior Publication Data

US 2024/0316693 A1 Sep. 26, 2024

(30) Foreign Application Priority Data

Mar. 22, 2023 (JP) ................................ 2023-045104

(51) Int. Cl.

| | |
|---|---|
| ***B23K 26/21*** | (2014.01) |
| ***B23K 26/062*** | (2014.01) |
| ***B23K 26/082*** | (2014.01) |
| ***B23K 101/18*** | (2006.01) |
| ***B23K 103/04*** | (2006.01) |

(52) U.S. Cl.
CPC .......... *B23K 26/21* (2015.10); *B23K 26/0626* (2013.01); *B23K 26/082* (2015.10); *B23K 2101/18* (2018.08); *B23K 2103/04* (2018.08)

(58) Field of Classification Search
CPC .. B23K 26/0626; B23K 26/082; B23K 26/21; B23K 26/244; B23K 2101/18; B23K 2103/04
See application file for complete search history.

(56) References Cited

U.S. PATENT DOCUMENTS

| | | | |
|---|---|---|---|
| 2014/0048518 | A1 | 2/2014 | Ogura et al. |
| 2017/0106470 | A1 | 4/2017 | Solomon et al. |
| 2018/0141158 | A1 | 5/2018 | Yang et al. |
| 2019/0118307 | A1 | 4/2019 | Wang et al. |

FOREIGN PATENT DOCUMENTS

| | | | |
|---|---|---|---|
| JP | 2004-209536 | A | 7/2004 |
| JP | 2012-228715 | A | 11/2012 |
| WO | 2018229993 | A1 | 12/2018 |

*Primary Examiner* — Thien S Tran
(74) *Attorney, Agent, or Firm* — Sughrue Mion, PLLC

(57) ABSTRACT

A laser welding method for irradiating a plurality of stacked metal plates in an upright position with a laser beam to weld the plurality of stacked metal plates is provided. The laser welding method includes irradiating the plurality of metal plates with the laser beam to form a circular molten pool and scanning the laser beam once around an outer periphery of the molten pool to enlarge the molten pool. In the enlarging of the molten pool, a scanning start point of the laser beam is set within a range from 135 degrees to 315 degrees in a scanning direction of the laser beam, with 0 degrees directly above the molten pool in a vertical direction.

6 Claims, 6 Drawing Sheets

LASER WELDING METHOD

CROSS REFERENCE TO RELATED APPLICATIONS

This application is based upon and claims the benefit of priority from Japanese patent application No. 2023-045104, filed on Mar. 22, 2023, the disclosure of which is incorporated herein in its entirety by reference.

BACKGROUND

The present disclosure relates to a laser welding method.

Japanese Unexamined Patent Application Publication No. 2012-228715 discloses that a plurality of stacked metal plates are irradiated with a laser beam while the laser beam is scanned in a circular shape to weld the plurality of metal plates.

SUMMARY

The inventors have found the following problem with a laser welding method for irradiating a plurality of stacked metal plates with a laser beam while scanning the laser beam in a circular shape to weld the plurality of stacked metal plates.

When a plurality of stacked metal plates are welded in an upright position, if a molten pool becomes larger to a certain extent and an amount of molten metal increases, the thickness of the vertically upper part of the molten pool in the plate thickness direction decreases due to gravity acting on the molten pool. Therefore, there is a risk that a keyhole formed in the molten pool may become too large due to the irradiation of the laser beam, and welding failures such as generation of a hole may occur.

The present disclosure has been made in light of such circumstances and provides a laser welding method capable of suppressing the occurrence of welding failures when a plurality of stacked metal plates are welded in an upright position.

In an aspect of the present disclosure, a laser welding method for irradiating a plurality of stacked metal plates in an upright position with a laser beam to weld the plurality of stacked metal plates includes:

- irradiating the plurality of metal plates with the laser beam to form a circular molten pool; and
- scanning the laser beam once around an outer periphery of the molten pool to enlarge the molten pool, wherein in the enlarging of the molten pool, a scanning start point of the laser beam is set within a range from 135 degrees to 315 degrees in a scanning direction of the laser beam, with 0 degrees directly above the molten pool in a vertical direction.

In the laser welding method according to the aspect of the present disclosure, in the scanning of the laser beam once around an outer periphery of the molten pool to enlarge the molten pool, a scanning start point of the laser beam is set within a range from 135 degrees to 315 degrees in a scanning direction of the laser beam, with 0 degrees directly above the molten pool in a vertical direction.

In this configuration, when the laser beam is emitted on the vertically upper side of the molten pool, the molten pool is not sufficiently enlarged, and thus the amount of molten metal in the molten pool is small. Therefore, the necking generated on the vertically upper side of the molten pool is small, so that the keyhole formed on the vertically upper side of the molten pool does not become too large. Accordingly, it is possible to suppress the occurrence of welding failures such as generation of a hole.

In the enlarging of the molten pool, the scanning start point of the laser beam may be set within a range from 180 degrees to 270 degrees in the scanning direction of the laser beam. With this configuration, it is possible to better suppress the occurrence of welding failures such as generation of a hole.

In the enlarging of the molten pool, the vertical direction may be detected by a sensor, and the scanning start point of the laser beam may be determined based on the vertical direction detected by the sensor. This configuration allows the laser welding system to automatically determine the scanning start point of the laser beam.

In the enlarging of the molten pool, an irradiation energy density of the laser beam may be reduced more on a vertically upper side of the molten pool than on a vertically lower side of the molten pool. With this configuration, it is possible to better suppress the occurrence of welding failures such as generation of a hole.

In another aspect of the present disclosure, a laser welding method for irradiating a plurality of stacked metal plates in an upright position with a laser beam to weld the plurality of stacked metal plates includes:

- irradiating the plurality of metal plates with the laser beam to form a circular molten pool; and
- scanning the laser beam once around an outer periphery of the molten pool to enlarge the molten pool, wherein in the enlarging of the molten pool, an irradiation energy density of the laser beam is reduced more on a vertically upper side of the molten pool than on a vertically lower side of the molten pool.

In the laser welding method according to the aspect of the present disclosure, in the enlarging of the molten pool, an irradiation energy density of the laser beam is reduced more on a vertically upper side of the molten pool than on a vertically lower side of the molten pool.

Therefore, a keyhole formed on the vertically upper side of the molten pool does not become too large, and the occurrence of welding failures such as generation of a hole can be suppressed.

In the enlarging of the molten pool, the irradiation energy density of the laser beam may be gradually decreased from the vertically lower side of the molten pool toward the vertically upper side of the molten pool and may be gradually increased from the vertically upper side of the molten pool toward the vertically lower side of the molten pool.

According to the present disclosure, it is possible to provide a laser welding method capable of suppressing the occurrence of welding failures when a plurality of stacked metal plates are welded in an upright position.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments of the present disclosure will now be described in detail with reference to the drawings. However, the present disclosure is not limited to the following embodiments. In addition, for clarity, the following descriptions and drawings have been simplified as appropriate.

First Embodiment

<Configuration of Laser Welding System>

First, a laser welding system according to a first embodiment will be described with reference to FIG. 1.

Figure 1:
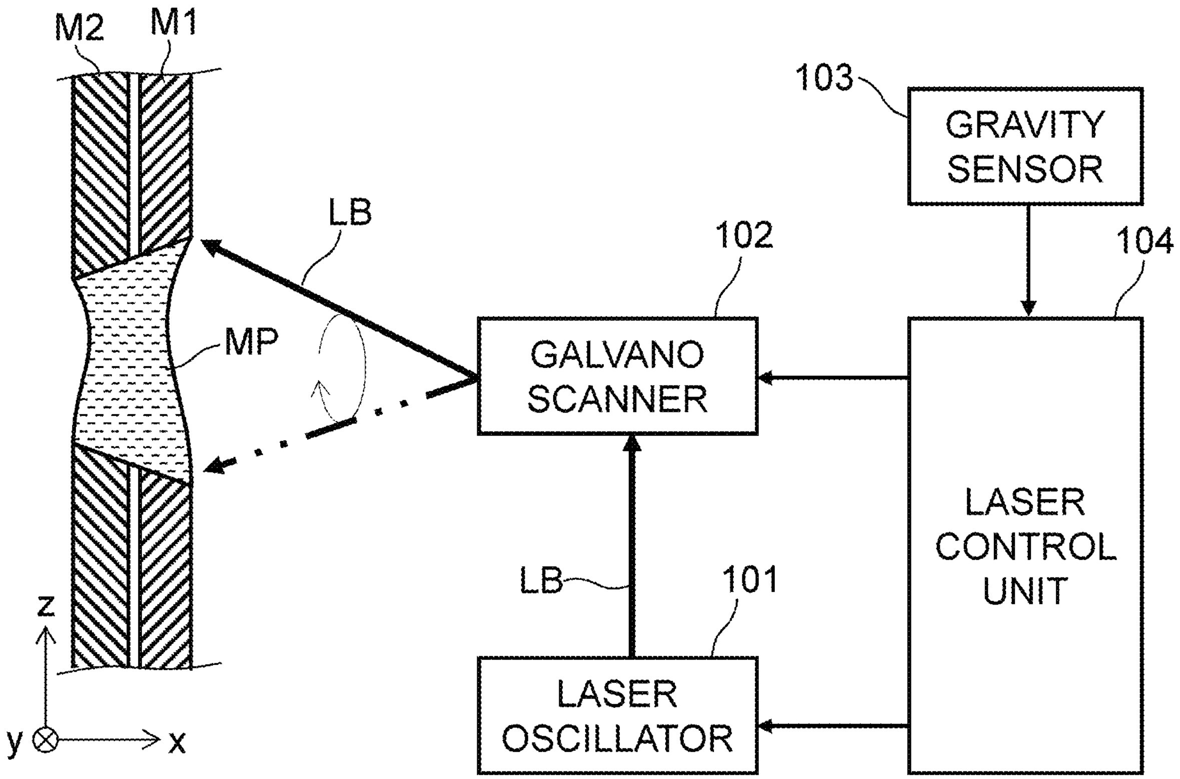
FIG. 1 is a block diagram showing a laser welding system according to a first embodiment.

FIG. 1 is a block diagram showing the laser welding system according to the first embodiment. As shown in FIG. 1, the laser welding system according to this embodiment irradiates two stacked metal plates M1 and M2 in an upright position with a laser beam LB to thereby form a molten pool MP penetrating through the two metal plates M1 and M2, welding the two metal plates M1 and M2.

The laser welding system shown in FIG. 1 is mounted, for example, on a manipulator (robot arm).

As shown in FIG. 1, the laser welding system according to this embodiment includes a laser oscillator 101, a galvano scanner 102, a gravity sensor 103, and a laser control unit 104.

Note that, of course, the right-handed xyz orthogonal coordinates shown in FIG. 1 and other drawings are for convenience in explaining the positional relationship of the components. In FIG. 1 and other drawings, the z-axis positive direction is vertically upward and the xy plane is a horizontal plane, which are consistent across the drawings.

Furthermore, the metal plates M1 and M2, which are objects to be welded, are not limited in any way, but may be, for example, steel plates, aluminum alloy plates, and so on that constitute a vehicle. The metal plates M1 and M2 may be composed of, for example, the same type of metal, but they may also be composed of different types of metals.

Additionally, the number of metal plates to be welded may be three or more.

The laser oscillator 101 oscillates the laser beam LB with a laser output based on a control signal output from the laser control unit 104. The laser beam LB output from the laser oscillator 101 is input to the galvano scanner 102.

The laser oscillator 101 and the galvano scanner 102 constitute a laser irradiation unit for irradiating the metal plates M1 and M2, which are the objects to be welded, with the laser beam LB.

The galvano scanner 102 irradiates the metal plates M1 and M2 with the laser beam LB while scanning the metal plates M1 and M2, which are the objects to be welded, based on the control signal output from the laser control unit 104. Based on the control signal output from the laser control unit 104, for example, a spot diameter $d_s$, a scanning speed $v_s$, a path, a scanning start point, and so on of the laser beam LB emitted from the galvano scanner 102 are determined.

As shown in FIG. 1, the laser beam LB emitted from the galvano scanner 102 is scanned, for example, in a circular shape on the stacked metal plates M1 and M2, thereby forming the molten pool MP having a circular shape in a yz plane view.

Further, the laser beam LB is scanned once around the outer periphery of the formed circular molten pool MP to enlarge the molten pool MP.

The gravity sensor 103 is a sensor for detecting the gravity direction, i.e., the vertical direction. Note that the gravity sensor 103 is not required.

The laser control unit 104 controls irradiation conditions of the laser beam LB. Specifically, the laser control unit 104 controls an output (laser output) P of the laser beam LB oscillated by the laser oscillator 101. The laser control unit 104 also controls the spot diameter $d_s$, the scanning speed $v_s$, and the path of the laser beam LB emitted from the galvano scanner 102.

In addition, the laser control unit 104 determines the scanning start point of the laser beam LB when the laser beam LB is scanned once in a circle to enlarge the molten pool MP based on the vertical direction detected by the gravity sensor 103. The details of the method for determining the scanning start point of the laser control unit 104 will be described later.

Although not shown, the laser control unit 104 includes, for example, an arithmetic unit such as a CPU (Central Processing Unit) and a storage unit such as a RAM (Random Access Memory) and a ROM (Read Only Memory) storing various control programs and data. That is, the laser control unit 104 has a function as a computer and performs various control processes based on the control program.

Therefore, the laser control unit 104 shown in FIG. 1 can be constructed by hardware components such as the above CPU, storage unit, and other circuits, and can be implemented with software components including various control programs stored in the storage unit. That is, the laser control unit 104 can be implemented in a variety of forms by hardware, software, or a combination of both.

<Laser Welding Method>

Figure 2:
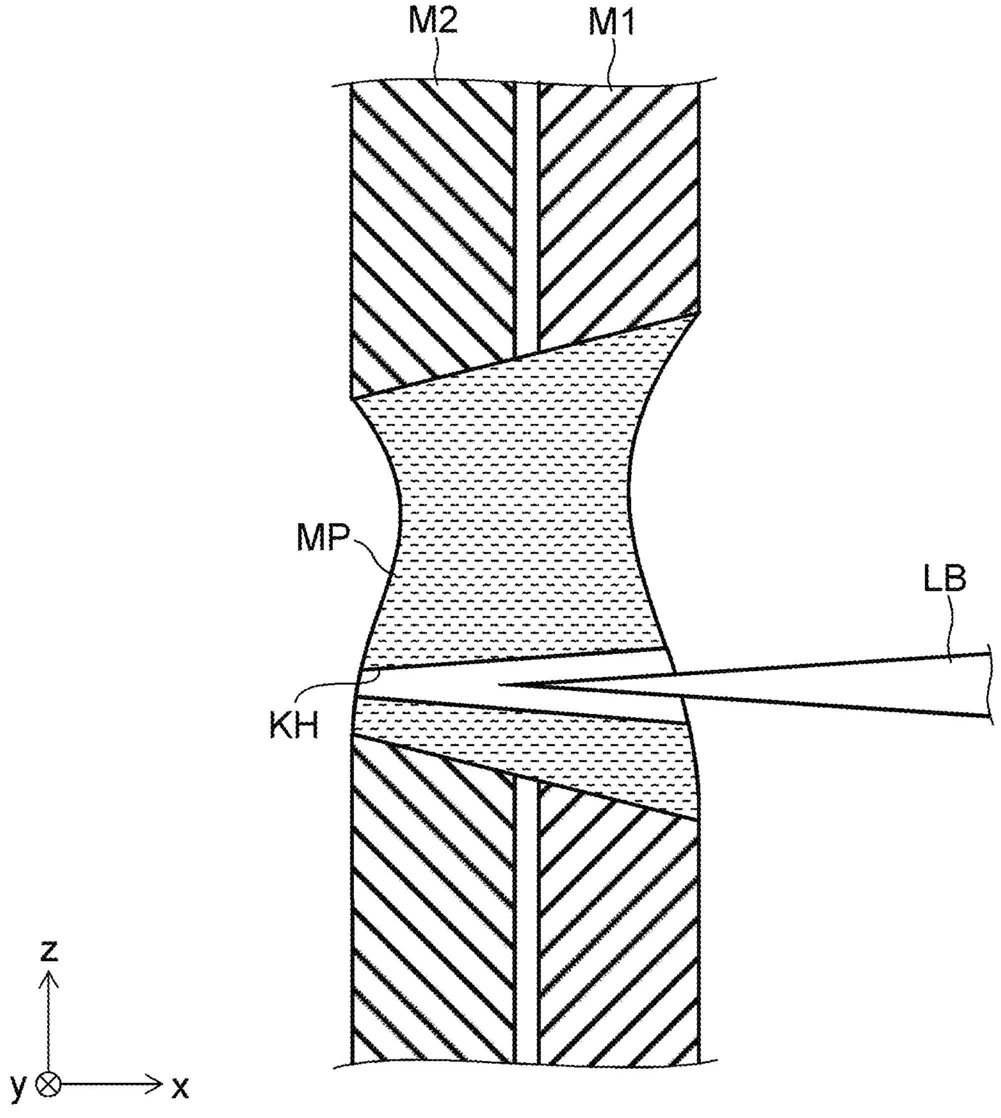
FIG. 2 is a cross-sectional view in an xz plane showing enlargement of a molten pool MP by scanning a laser beam LB once around an outer periphery of the circular molten pool MP.
Figure 3:
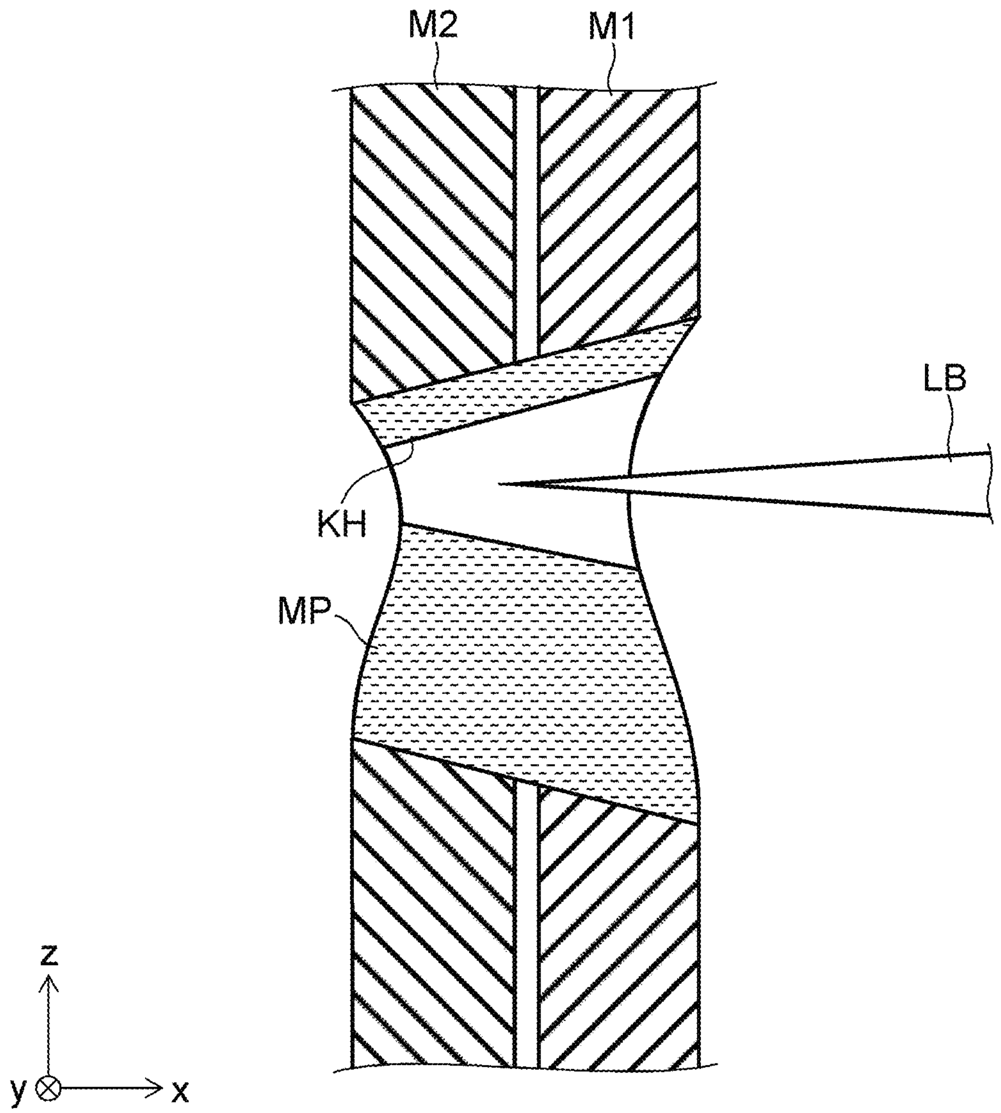
FIG. 3 is a cross-sectional view in an xz plane showing enlargement of a molten pool MP by scanning a laser beam LB once around an outer periphery of the circular molten pool MP.
Figure 4:
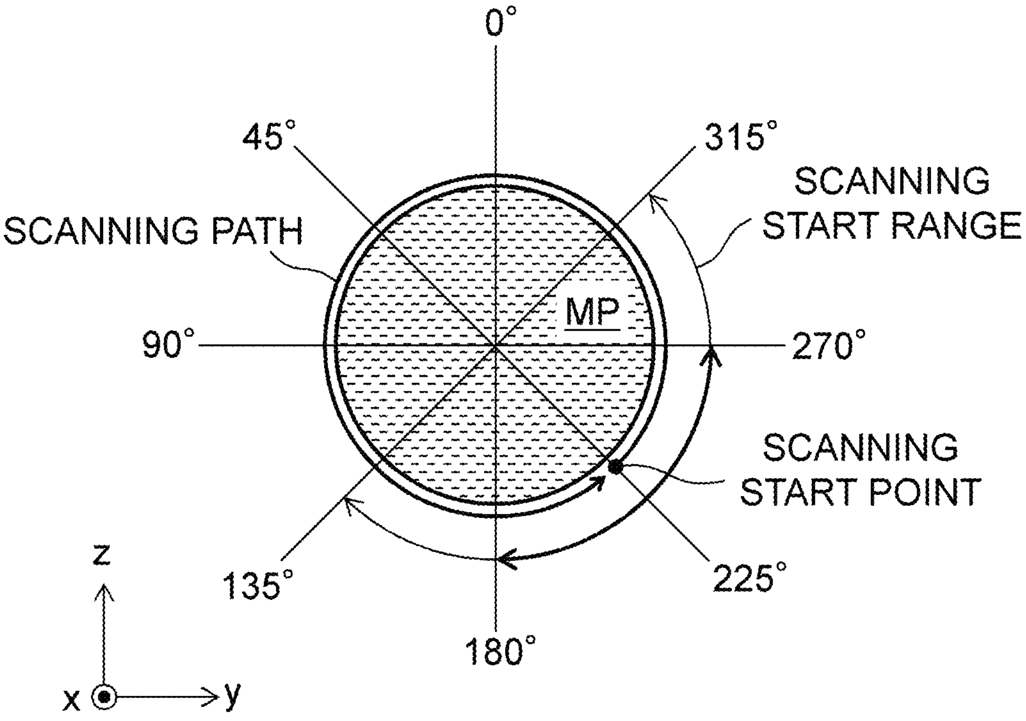
FIG. 4 is a schematic yz plane view showing a scanning path when the laser beam LB is scanned once around the outer periphery of the circular molten pool MP to enlarge the molten pool MP in the laser welding method according to the first embodiment.

Next, a laser welding method according to the first embodiment will be described with reference to FIGS. 2 to 4. FIGS. 2 and 3 are cross-sectional views in an xz plane showing enlargement of the molten pool MP by scanning the laser beam LB once around an outer periphery of the circular molten pool MP. FIG. 4 is a schematic yz plane view showing a scanning path when the laser beam LB is scanned once around the outer periphery of the circular molten pool MP to enlarge the molten pool MP in the laser welding method according to the first embodiment.

First, as described with reference to FIG. 1, the laser beam LB emitted from the galvano scanner 102 is emitted onto the two stacked metal plates M1 and M2 in an upright position. Here, as shown in FIG. 1, for example, by scanning the laser beam LB in a circular shape on the stacked metal plates M1 and M2, the molten pool MP having a circular shape in a yz-plane view is formed.

The state in which the two stacked metal plates M1 and M2 are in an upright position is not limited to the state in which the main surfaces of the metal plates M1 and M2 are parallel to the vertical direction. For example, the state in which the two stacked metal plates M1 and M2 are in an upright position includes the state in which the main surfaces of the metal plates M1 and M2 are inclined toward the vertical direction to a certain extent.

Next, as shown in FIGS. 2 and 3, the laser beam LB is scanned once around the outer periphery of the circular molten pool MP to enlarge the molten pool MP.

At this time, as shown in FIGS. 2 and 3, as the molten pool MP becomes larger, the thickness of the vertically upper side of the molten pool MP in the plate thickness direction decreases due to gravity acting on the molten pool MP. In other words, necking in the plate thickness direction is generated on the vertically upper side of the molten pool MP. Further, the larger the gap between the metal plates M1 and M2, the greater the necking on the vertically upper side of the molten pool MP becomes.

As shown in FIGS. 2 and 3, for example, a keyhole KH penetrating the molten pool MP is formed in the molten pool MP by the irradiation of the laser beam LB. As described above, the thickness of the vertically upper side of the molten pool MP in the plate thickness direction decreases. Therefore, if the irradiation energy density of the laser beam LB is constant, the keyhole KH formed on the vertically upper side of the molten pool MP shown in FIG. 3 becomes larger than the keyhole KH formed on the vertically lower side of the molten pool MP shown in FIG. 2.

The details of the irradiation energy density of the laser beam LB will be described in a second embodiment.

Thus, as shown in FIG. 3, when the laser beam LB is emitted on the vertically upper side of the molten pool MP after the molten pool MP is enlarged, there is a risk that the keyhole KH may become too large, and welding failures such as generation of a hole may occur.

Therefore, in the laser welding method according to this embodiment, when the laser beam LB is scanned once around the outer periphery of the circular molten pool MP to enlarge the molten pool MP, the scanning start point of the laser beam LB is set within a predetermined range shown in FIG. 4.

A radius of the circular scanning path shown in FIG. 4 is, for example, 1.0 mm or more, and preferably 2.0 mm or more.

Specifically, as indicated by the thin bidirectional arrow in FIG. 4, the scanning start point of the laser beam LB is set within the range of 135 degrees to 315 degrees in the scanning direction of the laser beam LB, with 0 degrees being directly above the molten pool MP in the vertical direction. Preferably, the scanning start point of the laser beam LB is set within the range of 180 degrees to 270 degrees in the scanning direction of the laser beam LB, as indicated by the thick bidirectional arrow in FIG. 4.

In this configuration, when the laser beam LB is emitted on the vertically upper side of the molten pool MP, the molten pool MP is not sufficiently enlarged, and thus the amount of molten metal in the molten pool MP is small. Therefore, the necking shown in FIGS. 2 and 3 generated on the vertically upper side of the molten pool MP is small, so that the keyhole KH formed on the vertically upper side of the molten pool MP does not become too large, and the occurrence of welding failures such as generation of a hole can be suppressed.

The molten pool MP is displayed with dots for easy understanding in FIG. 4, even though FIG. 4 is a plan view.

In FIG. 4, the laser beam LB is scanned counterclockwise, but the laser beam LB may be scanned clockwise.

Figure 5:
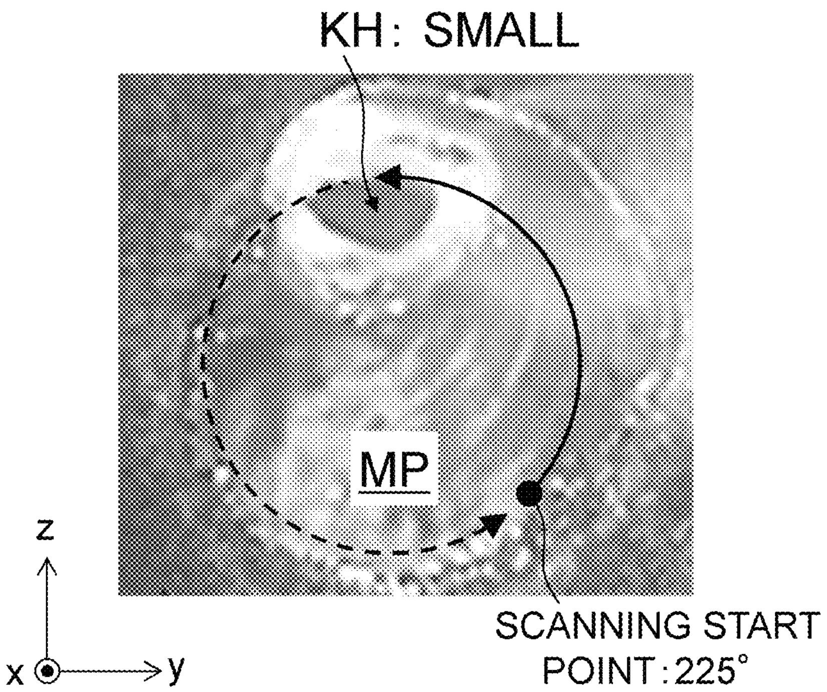
FIG. 5 is a macro photograph showing a keyhole KH formed at a part directly above the molten pool MP in the vertical direction in the laser welding method according to an example of the first embodiment.
Figure 6:
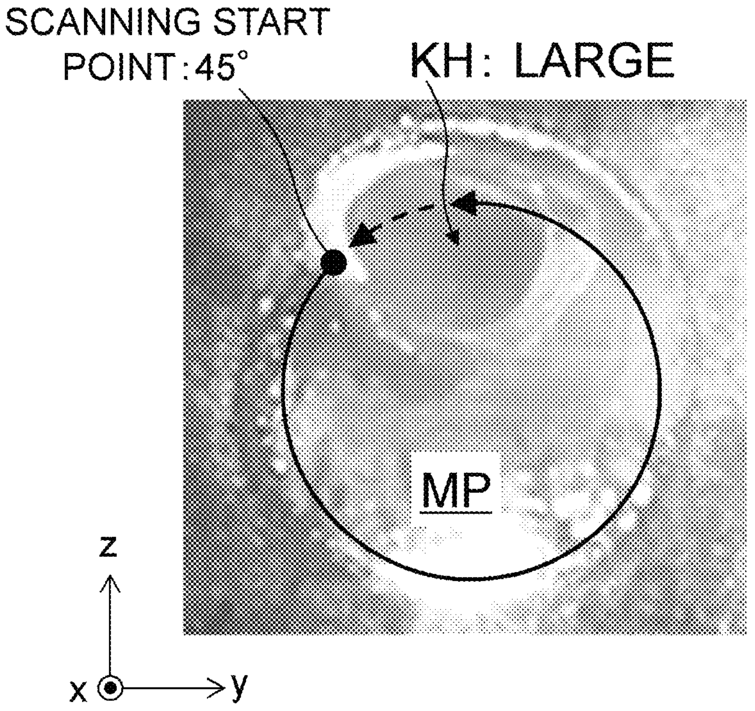
FIG. 6 is a macro photograph showing the keyhole KH formed at a part directly above the molten pool MP in the vertical direction in the laser welding method according to a comparative example of the first embodiment.

FIG. 5 is a macro photograph showing the keyhole KH formed at a part directly above the molten pool MP in the vertical direction in the laser welding method according to an example of the first embodiment. FIG. 6 is a macro photograph showing the keyhole KH formed at a part directly above the molten pool MP in the vertical direction in the laser welding method according to a comparative example of the first embodiment.

In the example shown in FIG. 5, when the molten pool MP is enlarged, the scanning start point of the laser beam LB is set to 225 degrees in the scanning direction of the laser beam LB, with 0 degrees being directly above the molten pool MP in the vertical direction. On the other hand, in the comparative example shown in FIG. 6, when the molten pool MP is enlarged, the scanning start point of the laser beam LB is set to 45 degrees in the scanning direction of the laser beam LB, with 0 degrees being directly above the molten pool MP in the vertical direction.

The keyhole KH in the comparative example shown in FIG. 6 is larger than the keyhole KH in the example shown in FIG. 5.

In the comparative example shown in FIG. 6, the laser beam LB is scanned over 315 degrees in one rotation, which is 360 degrees, before reaching a part directly above the molten pool MP in the vertical direction (0 degrees in FIG. 4). Therefore, the molten pool MP is sufficiently enlarged, and thus the amount of molten metal in the molten pool MP is increased. As a result, it is considered that the necking shown in FIGS. 2 and 3 generated on the vertically upper side of the molten pool MP becomes large, and thus the keyhole KH becomes larger.

In contrast, in the example shown in FIG. 5, the laser beam LB is scanned over 135 degrees in one rotation, which is 360 degrees, before reaching a part directly above the molten pool MP in the vertical direction (0 degrees in FIG. 4). Therefore, the molten pool MP is not sufficiently enlarged, and thus the amount of molten metal in the molten pool MP is small. As a result, it is considered that the necking shown in FIGS. 2 and 3 generated on the vertically upper side of the molten pool MP is small, and thus the keyhole KH becomes smaller. As described so far, the laser welding method according to the example can suppress the occurrence of welding failures such as generation of a hole compared with the laser welding method according to the comparative example.

The details of the example and the comparative example will be described later.

As described above, in the laser welding method according to this embodiment, when the laser beam LB is scanned once around the outer periphery of the circular molten pool MP to enlarge the molten pool MP, the scanning start point of the laser beam LB is set within a predetermined range. Specifically, the scanning start point of the laser beam LB is set within the range of 135 degrees to 315 degrees in the scanning direction of the laser beam LB, with 0 degrees being directly above the molten pool MP in the vertical direction.

In this configuration, when the laser beam LB is emitted on the vertically upper side of the molten pool MP, the molten pool MP is not sufficiently enlarged, and thus the amount of molten metal in the molten pool MP is small. Thus, the necking shown in FIGS. 2 and 3 generated on the vertically upper side of the molten pool MP is small, so that the keyhole KH formed on the vertically upper side of the molten pool MP does not become too large. Therefore, the laser welding method according to this embodiment can suppress the occurrence of welding failures such as generation of a hole.

Second Embodiment

Figure 7:
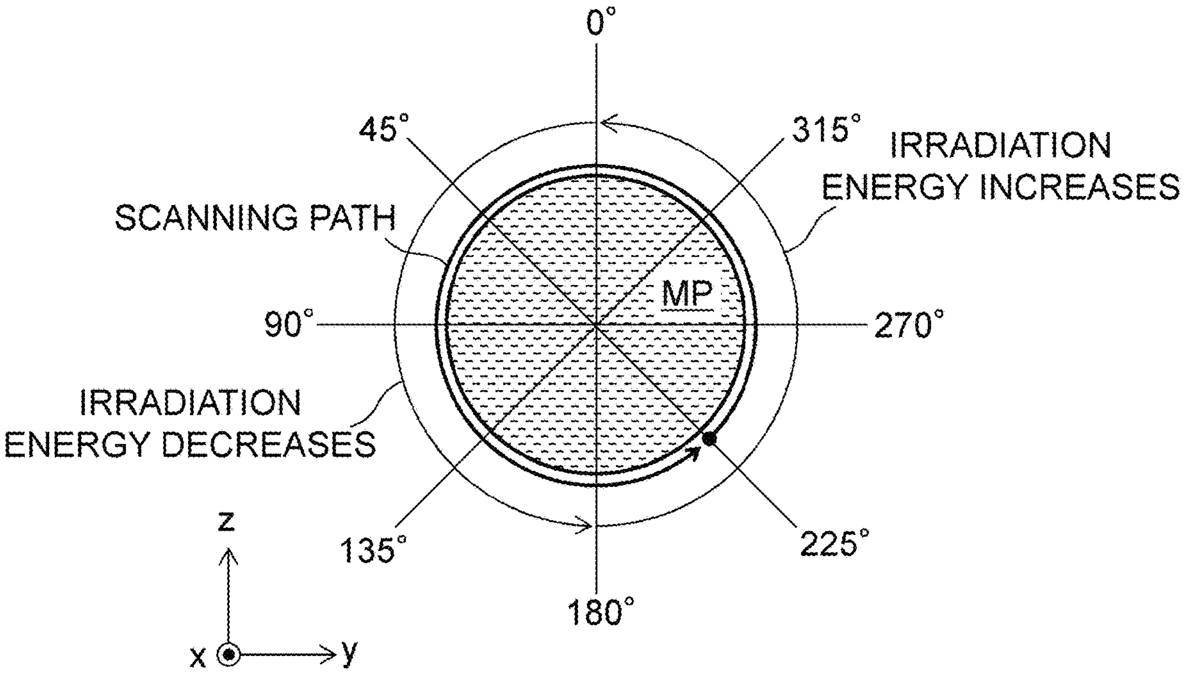
FIG. 7 is a schematic yz plane view showing a scanning path when the laser beam LB is scanned once around the outer periphery of the circular molten pool MP to enlarge the molten pool MP in the laser welding method according to a second embodiment.

Next, a laser welding method according to a second embodiment will be described with reference to FIG. 7. FIG. 7 is a schematic yz plane view showing a scanning path when the laser beam LB is scanned once around the outer periphery of the circular molten pool MP to enlarge the molten pool MP in the laser welding method according to a second embodiment.

The molten pool MP is displayed with dots for easy understanding in FIG. 7, in a manner similar to FIG. 4, even though FIG. 7 is a plan view. In FIG. 7, the laser beam LB is scanned counterclockwise, but the laser beam LB may be scanned clockwise.

In the laser welding method according to this embodiment, the laser beam LB is scanned once around the outer periphery of the circular molten pool MP, and when the molten pool MP is enlarged, an irradiation energy density E of the laser beam LB is reduced on the vertically upper side of the molten pool MP compared to that on the vertically lower side of the molten pool MP.

In the laser welding method according to this embodiment, the scanning start point of the laser beam LB may be any position.

Here, the irradiation energy density E [J/mm$^2$] of the laser beam LB can be expressed by the following Expression (1), using the laser output P [W], the scanning speed $v_s$ [mm/s], and the spot diameter $d_s$ [mm].

$$E = P/(v_s \times d_s) \qquad \text{Expression (1)}$$

Therefore, the irradiation energy density E is reduced by reducing the laser output P, increasing the scanning speed $v_s$, or increasing the spot diameter $d_s$. As an example, the irradiation energy density E of the laser beam LB on the vertically upper side of the molten pool MP is set to be about 50% to 90% of the irradiation energy density E of the laser beam LB on the vertically lower side of the molten pool MP.

In the example shown in FIG. 7, the irradiation energy density of the laser beam LB is set to be the maximum value at a part directly below the molten pool MP in the vertical direction (180 degrees in FIG. 7) and the minimum value at a part directly above the molten pool MP in the vertical direction (0 degrees in FIG. 7). Then, the irradiation energy density of the laser beam LB is gradually decreased from the part directly below the molten pool MP in the vertical direction toward the part directly above the molten pool MP in the vertical direction, and gradually increased from the part directly above the molten pool MP in the vertical direction toward the part directly below the molten pool MP in the vertical direction.

Note that the irradiation energy density of the laser beam LB may be constant at a maximum value within a predetermined range (e.g., 135 to 225 degrees in FIG. 7) including the part directly below the molten pool MP in the vertical direction. The irradiation energy density of the laser beam LB may be constant at a minimum value within a predetermined range (e.g., 0 to 45 degrees and 315 to 360 degrees in FIG. 7) including the part directly above the molten pool MP in the vertical direction.

As described above, in the laser welding method according to this embodiment, when the laser beam LB is scanned once around the outer periphery of the circular molten pool MP to enlarge the molten pool MP, the irradiation energy density of the laser beam LB is reduced more on the vertically upper side of the molten pool MP than on the vertically lower side of the molten pool MP. Therefore, regardless of the scanning start point of the laser beam LB, the keyhole KH formed on the vertically upper side of the molten pool MP does not become too large, and the occurrence of welding failures such as generation of a hole can be suppressed.

The configurations other than those described above are the same as those according to the first embodiment, and the description thereof is omitted. Note that this embodiment may be combined with the first embodiment. That is, when the molten pool MP is enlarged, the scanning start point of the laser beam LB may be set within the range from 135 degrees to 315 degrees in the scanning direction of the laser beam LB, and the irradiation energy density of the laser beam LB may be reduced more at the part on the vertically upper side of the molten pool MP than at the part on the vertically lower side of the molten pool MP.

EXAMPLE

The laser welding method according to the first embodiment will be described in detail below with an example and a comparative example. However, the laser welding method according to the first embodiment is not limited to the following examples.

Test Conditions

First, test conditions of the laser welding method according to the example and comparative example will be described.

A set of stacked three steel plates (upper plate, middle plate, and lower plate) in an upright position were welded with a laser beam LB emitted from the upper plate side. A hot-dip galvanized steel plate SCGA440 was used as the upper, middle, and lower plates. The thickness of the upper plate was 1.4 mm, the thickness of the middle plate was 2.0 mm, and the thickness of the lower plate was 1.8 mm.

A gap between the upper plate and the middle plate was made equal to a gap between the middle plate and the lower plate. In each of the example and comparison example, a set of three steel plates was used in which both the gap between the upper plate and the middle plate and the gap between the middle plate and the lower plate were changed in three stages of 0.1 mm, 0.3 mm, and 0.6 mm. Each of the three types of the sets of three steel plates in the example and comparison example was welded at 1000 positions.

A 20 kW ring laser oscillator manufactured by IPG was used as the laser oscillator 101. A 3D galvano-head unit YD-3000ML manufactured by Yaskawa Electric Co., Ltd. (with an optical magnification factor of 7.4) was used as the galvano scanner 102.

Regarding the irradiation conditions of the laser beam LB, the laser output P was set at 15 KW, the scanning speed $v_s$ at 108 mm/s, and the spot diameter $d_s$ at 0.74 mm, and these values were kept constant. First, after a circular molten pool MP with a radius of about 1.5 mm was formed, the laser beam LB was scanned in a circular shape with a radius of 2.5 mm along the outer periphery of the molten pool MP.

In addition, compressed air with a flow rate of 3.0 m/s was supplied to the parts of the steel plates irradiated with the laser beam LB, i.e., the part of the steel plates welded with the laser beam LB.

As shown in FIGS. 5 and 6, the scanning start point of the laser beam LB when the molten pool MP was enlarged (i.e., when the laser beam LB is scanned once around the outer periphery of the circular molten pool MP) was changed in the example and the comparative example. In the example shown in FIG. 5, the scanning start point of the laser beam LB is set to 225 degrees in the scanning direction of the laser beam LB, with 0 degrees being directly above the molten pool MP in the vertical direction. On the other hand, in the comparative example, as shown in FIG. 6, when the molten pool MP is enlarged, the scanning start point of the laser beam LB is set to 45 degrees in the scanning direction of the laser beam LB, with 0 degrees being directly above the molten pool MP in the vertical direction.

Test Results

In the laser welding method according to the example, no welding failure occurred in any of the cases where the gap between the set of three steel plates was 0.1 mm, 0.3 mm, and 0.6 mm.

Also in the laser welding method according to the comparative example, no welding failure occurred in any of the cases where the gap between the set of three steel plates was 0.1 mm and 0.3 mm. On the other hand, in the laser welding method according to the comparative example, when the gaps between the set of three steel plates was 0.6 mm, a 12% welding failure occurred.

The keyhole KH in the comparative example shown in FIG. 6 is larger than the keyhole KH in the example shown in FIG. 5.

In the comparative example shown in FIG. 6, the laser beam LB is scanned over 315 degrees in one rotation, which is 360 degrees, before reaching a part directly above the molten pool MP in the vertical direction (0 degrees in FIG. 4). Therefore, the molten pool MP is sufficiently enlarged, and thus the amount of molten metal in the molten pool MP is increased. As a result, it is considered that the necking shown in FIGS. 2 and 3 generated on the vertically upper side of the molten pool MP becomes large, and thus the keyhole KH becomes larger.

In contrast, in the example shown in FIG. 5, the laser beam LB is scanned over 135 degrees in one rotation, which is 360 degrees, before reaching a part directly above the molten pool MP in the vertical direction (0 degrees in FIG. 4). Therefore, the molten pool MP is not sufficiently enlarged, and thus the amount of molten metal in the molten pool MP is small. As a result, it is considered that the necking shown in FIGS. 2 and 3 generated on the vertically upper side of the molten pool MP is small, and thus the keyhole KH becomes smaller.

As described above, with the laser welding method according to the example, it is possible to suppress the occurrence of welding failures such as generation of a hole compared with the laser welding method according to the comparative example. In other words, it is found that the occurrence of welding failures such as generation of a hole can be suppressed by the laser welding method according to the first embodiment.

It is also found that the laser welding method according to the first embodiment can effectively suppress the occurrence of welding failures as the gap between metal plates increases.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A laser welding method for irradiating a plurality of stacked metal plates in an upright position with a laser beam to weld the plurality of stacked metal plates, the laser welding method comprising:
- irradiating the plurality of metal plates with the laser beam to form a circular molten pool; and
- scanning the laser beam once around an outer periphery of the molten pool to enlarge the molten pool, wherein
- in the enlarging of the molten pool, a scanning start point of the laser beam is set within a range from 135 degrees to 315 degrees in a scanning direction of the laser beam, with 0 degrees directly above the molten pool in a vertical direction.

2. The laser welding method according to claim 1, wherein in the enlarging of the molten pool, the scanning start point of the laser beam is set within a range from 180 degrees to 270 degrees in the scanning direction of the laser beam.

3. The laser welding method according to claim 1, wherein
- in the enlarging of the molten pool, the vertical direction is detected by a sensor, and
- the scanning start point of the laser beam is determined based on the vertical direction detected by the sensor.

4. The laser welding method according to claim 1, wherein in the enlarging of the molten pool, an irradiation energy density of the laser beam is reduced more on a vertically upper side of the molten pool than on a vertically lower side of the molten pool.

5. A laser welding method for irradiating a plurality of stacked metal plates in an upright position with a laser beam to weld the plurality of stacked metal plates, the laser welding method comprising:
- irradiating the plurality of metal plates with the laser beam to form a circular molten pool; and
- scanning the laser beam once around an outer periphery of the molten pool to enlarge the molten pool, wherein
- in the enlarging of the molten pool, an irradiation energy density of the laser beam is reduced more on a vertically upper side of the molten pool than on a vertically lower side of the molten pool.

6. The laser welding method according to claim 5, wherein in the enlarging of the molten pool, the irradiation energy density of the laser beam is gradually decreased from the vertically lower side of the molten pool toward the vertically upper side of the molten pool and is gradually increased from the vertically upper side of the molten pool toward the vertically lower side of the molten pool.

* * * * *